Dec. 11, 1962 S. ALCARESE 3,067,503
BICYCLE HANDLE EXTRACTOR
Filed Jan. 6, 1959 2 Sheets-Sheet 1

Salvador Alcarese
INVENTOR.

Dec. 11, 1962

S. ALCARESE 3,067,503

BICYCLE HANDLE EXTRACTOR

Filed Jan. 6, 1959

Salvador Alcarese
INVENTOR.

United States Patent Office 3,067,503
Patented Dec. 11, 1962

3,067,503
BICYCLE HANDLE EXTRACTOR
Salvador Alcarese, Apdo. Postal 2, La Ceiba, Honduras
Filed Jan. 6, 1959, Ser. No. 785,160
1 Claim. (Cl. 29—259)

This invention relates to special purpose tools and more particularly to a tool for extracting the handles of bicycles with ease and dispatch.

It is often very difficult to pull the handle bars from bicycles since they stick, especially if they are old. Accordingly, the principal object of the invention is to provide a tool for facilitating this job. The tool that embodies the invention is mechanically simple in construction and very easy to use. Moreover the handle bars are removed without damage to them. Formerly, great difficulties were encountered in removing the handle bars and most of the time the handle bars were scratched or otherwise damaged.

Although the forks of bicycles are more or less the same, there is some variance between manufacturers' makes. A tool constructed in accordance with the invention is capable of removing handle bars from all brands of bicycles, even those that have locks such as the "humber" where the lock is provided with a dome that bulges out of the frame.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 1:
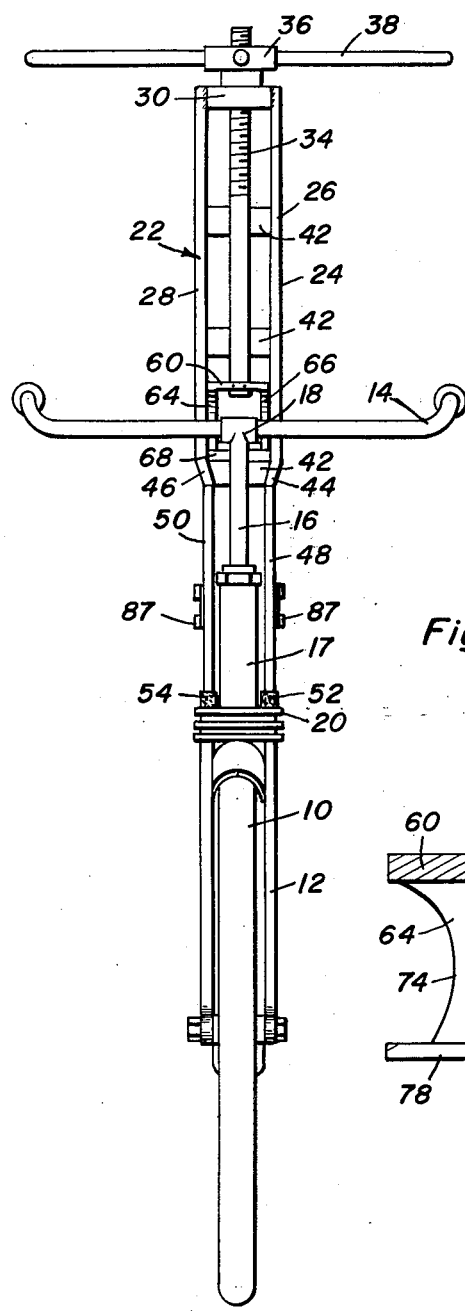
FIGURE 1 is a front elevational view of the extractor being used to remove the handle bars of a typical bicycle.
Figure 3:
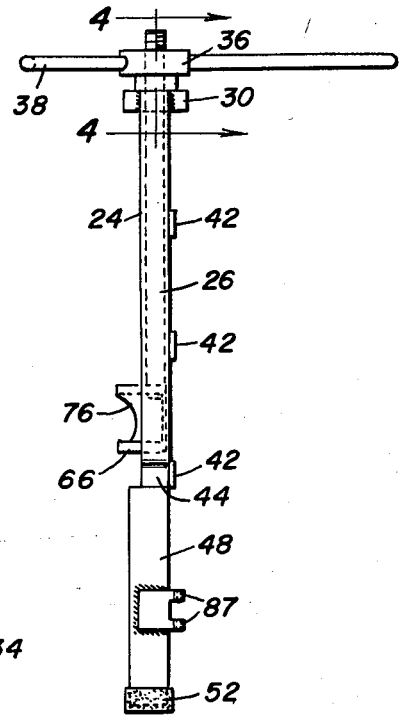
FIGURE 3 is a side view of the extractor.

In the accompanying drawings there is a bicycle 10 which schematically represents any manufacturers' make of bicycle. It has a fork member 12 and a handle bar 14. The handle bar has a shank or spindle 16 connected to them at a T-fitting 18 connecting the bars to the shank. Shoulders 20 project laterally of the upper portion of fork 12, and in some bicycles the shoulders are sloped and shaped slightly different.

Figure 4:
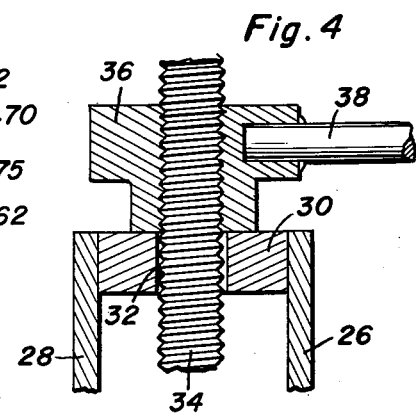
FIGURE 4 is an enlarged sectional view taken on the line 4—4 of FIGURE 3.
Figure 2:
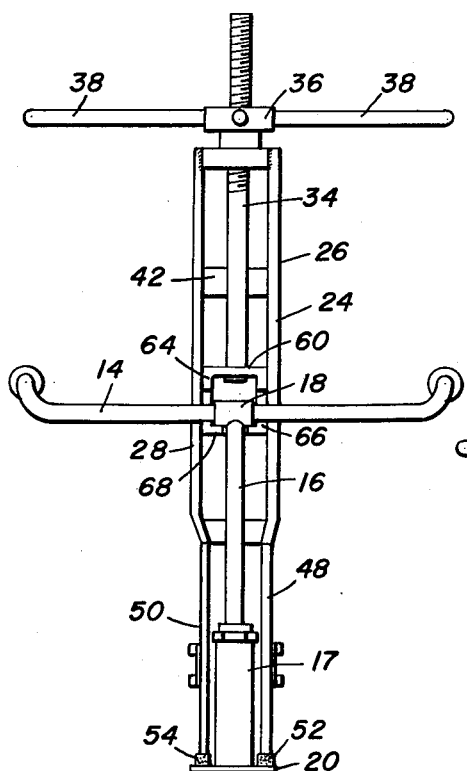
FIGURE 2 is a front elevational view of the extractor showing the handle bars almost removed by the extractor.

Extractor 22 consists of an inverted U-shaped frame 24 having depending leg portions or sides 26 and 28. An upper member or bight portion 30 is fixed to the upper ends of sides 26 and 28 (FIGURE 4) and has a passage or opening 32 through which screw 34 is passed. This screw has a nut 36 threaded on it, and hand grips, preferably as bars 38 attached to it and radially protruding therefrom in order to facilitate turning nut 36 on screw 34.

Intermediate transverse or brace members 42 are attached to the sides of the frame, these being flat parallel metal members of considerable strength. Sides 26 and 28 have inset parts 44 and 46 between their upper and lower ends, and side extensions 48 and 50 welded or otherwise secured thereto. The extensions are made slightly more substantial than the upper parts of the sides of the frame since they are unbraced transversely. They are adapted to fit alongside of the spindle 16, its bearing member 17 and behind the handle bar 14. The lower ends of the sides and more particularly, the side extensions 48 and 50, can have resilient pads or sockets 52 and 54 thereon defining abutment means to contact shoulders 20 and prevent damage to the finish thereon. These may be made of rubber or some other elastomer-type substance, felt or any other material that will serve the purpose.

Figure 7:
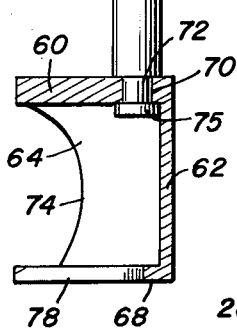
FIGURE 7 is a sectional view taken on the line 7—7 of FIGURE 6.
Figure 6:
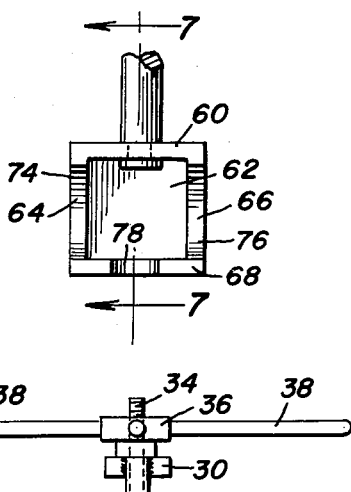
FIGURE 6 is a fragmentary elevational view showing the handle bar jaws that grip onto the handle bars, this being an important part of the extractor.

There are means connected to screw 34 for engaging and gripping the handle bars at fitting 18. These means are very important in the invention since they attach to the handle bars enabling them to be pulled upwardly in response to axial movement of screw 34 when nut 36 is rotated in one direction. As shown in FIGURES 6 and 7 the handle bar gripping or pulling means are in the nature of non-adjustable jaws constructed from a small box or housing with an upper wall 60, a back wall 62, side walls 64 and 66 and a bottom wall 68. There is an opening 70 in the top wall 60 to receive pintle 72 at the lower extremity of screw 34. Head 75 on the pintle enables the screw 34 to be rotated with respect to the wall 60, but the wall moves with the screw 34 when the screw is traveled axially in the frame of the extractor. There are two forwardly opening recesses 74 and 76 in wall 64 and 66 and these form pockets within which to accommodate the handle bar adjacent fitting 18. There is a forwardly opening recess 78 in wall 68 to accommodate the shank 16 of the handle bar.

Figure 5:
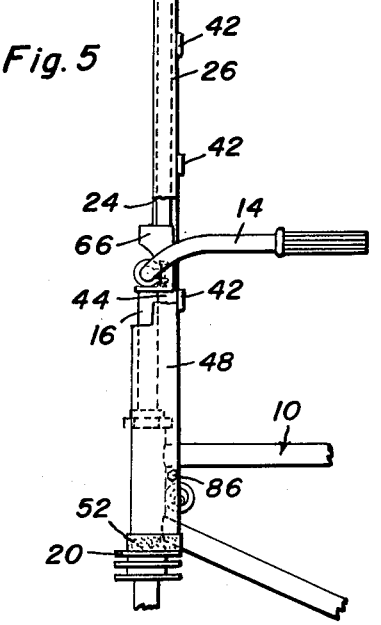
FIGURE 5 is an elevational side view of a modification.
Figure 8:
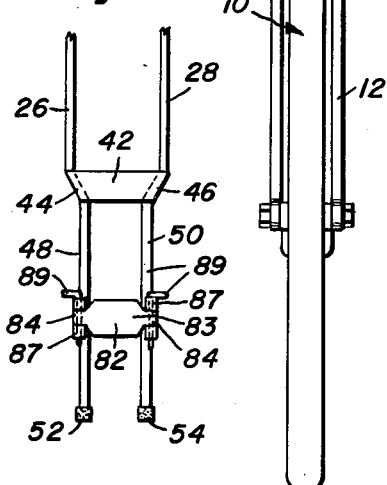
FIGURE 8 is a fragmentary elevational view showing the rear of the extractor in FIGURE 1 but separated from the bicycle.

As indicated previously each of the shoulders 20 may be sloped depending on the manufacturers' make of bicycle that is being repaired. For those that have sloping shoulders 20, a lateral component of force generated in the sides of the extractor will tend to spread the side extensions 48 and 50. To overcome this, latch 82 (FIGURE 8) is connected with the sides and adapted to fit behind bearing 17. The latch is made of a bar or plate 83 having hinge barrels 84 at its ends that fit between pairs of hinge barrels 87 fixed to the bar extensions and held assembled with barrels 84 by removable pins 89. When the latch is engaged, forces tending to spread the sides of the frame are opposed by the latch, preventing it from objectionably spreading. The embodiment of FIGURE 5 differs from FIGURE 1 by the use of bolt 86 in apertures in opposed parts of extensions 48 and 50. The bolt 86 constitutes a latch for the extractor sides just as the latch in FIGURE 8.

In use, the extractor is fitted onto the bicycle as described herein previously. Then the handle arms 38 of nut 36 are rotated in one direction which lifts screw 34 and the handle bar engaging device of FIGURE 6. This smoothly and evenly pulls the handle bar from the bearing member 17, without hammering or otherwise trying to remove them.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

For example, there are some bicycles and tricycles with which the extractor will not work because there is insufficient lift. In such cases, two legs placed on top of the small bicycle fork shoulders with the extractor on top of these legs are all that would be required to have the extractor function properly with a small bicycle or tricycle.

What is claimed as new is as follows:

A handle bar extractor for a bicycle having an upstanding bearing member rotatably journaling a fork member for rotation about an upstanding axis, said fork member including a pair of laterally projecting shoulders, a horizontally disposed handle bar, a fitting on said bar intermediate its opposite ends, and a depending shank supported from said fitting and having its lower end accommodated in said bearing member; said extractor comprising an inverted U-shaped frame having a pair of depending leg portions interconnected by means of an upper bight portion, a screw, a nut threaded on said screw, the bight portion of said frame having an opening through which said screw passes and comprising an abutment against which said nut reacts so that said screw is movable axially of said frame, resilient abutment means on the free ends of said leg portions of said frame for contacting said shoulders to provide a reaction for the axial separation of said shank from said bearing member, handle bar pulling means rotatably connected to said screw and adapted to engage said fitting for pulling said handle bar upon axial movement of said screw relative to said frame and thereby pulling said shank axially outwardly from said bearing member in which said shank is accommodated, said frame including brace members secured between said leg portions thereof, the lower end of said frame being free of permanent elements extending between the lower ends of said leg portions to accommodate said bearing member therebetween, said handle bar pulling means comprising a housing having a top wall, a pair of side walls attached to said top wall and having transversely aligned and forwardly opening recesses formed therein adapted to receive and thereby partially embrace said handle bar on opposite sides of said shank, a bottom wall attached to said side walls and having a recess which opens in the same direction as the recesses in said side walls and adapted to fit around said shank, said bottom wall constituting a seat against which the fitting that connects the shank to the handle bar is adapted to seat, a latch releasably connected to said frame leg portions adjacent the lower end thereof for preventing free ends of said leg portions from spreading apart.

References Cited in the file of this patent
UNITED STATES PATENTS

| | | |
|---|---|---|
| 1,060,872 | Wilson | May 6, 1913 |
| 1,673,397 | Corkum | June 12, 1928 |
| 1,737,084 | Hilstad | Nov. 26, 1929 |
| 1,849,538 | Bernitz | Mar. 15, 1932 |
| 2,250,642 | Mangham | July 29, 1941 |
| 2,664,620 | Beasley | Jan. 5, 1954 |
| 2,820,285 | Neumeister | Jan. 21, 1958 |
| 2,839,822 | Dillingham et al. | June 24, 1958 |